3,184,290
METHOD OF PRODUCING CARBON BLACK
Merrill E. Jordan, Walpole, Mass., assignor to Cabot Corporation, Boston, Mass., a corporation of Delaware
No Drawing. Filed Sept. 28, 1962, Ser. No. 227,075
10 Claims. (Cl. 23—209.4)

This invention relates to a novel carbon black and the process for producing same. More particularly, this invention relates to a novel, highly conductive carbon black produced from those hydrocarbonaceous tars or residues which have high contents of materials known generally in the art as asphaltenes or carbenes.

For the purposes of the present invention, the term, "asphaltenes" means that portion of asphalt or bitumen which is soluble in carbon di-sulfide but insoluble in paraffin oils and ethers.

The principal object of the present invention is to provide a novel carbon black product.

Another object of the present invention is to provide a process for producing a novel carbon black from asphaltenes and the like.

Still another object of the present invention is to provide a process whereby asphaltenes may be treated to produce products which may be pyrolzed at relatively low temperatures to produce novel carbon products.

Still another object of the present invention is to provide a process whereby petroleum tars having high concentrations of asphaltenes, e.g. above about 25%, may be pyrolyzed to produce desirable carbon products rather than a product in which there is present a relatively high concentration of a hard coke like material normally obtained by pyrolyzing stocks containing high concentrations of asphaltenes.

Other objects and advantages of the present invention will be obvious to those well skilled in the art or will appear hereinafter.

The above objects and advantages are achieved in accordance with the present invention by the pyrolysis of asphaltenes which have been treated with chemical oxidizing agents particularly nitric acid and nitric oxides. I have found that asphaltenes which have been treated with the above-mentioned oxidizing agents may be pyrolyzed at relatively low temperatures, e.g. above about 500° C. to produce desirable novel carbon products.

The treatment of the asphaltenes with chemical oxidizing agents especially nitric acid and nitric oxide is one of the critical features of my invention which insures the production of a novel carbon product especially at relatively low temperatures. In the practice of my invention, I prefer nitric acid as the most effective reagent because of its availability and the relatively uncomplicated manner in which the treatment may be accomplished therewith especially with solutions thereof. In practice, suitable treatment is generally accomplished by extracting the asphaltenes and thereafter mixing the generally comminuted asphaltenes with a nitric acid solution to form a slurry thereof. The resulting slurry is usually heated to a temperature between about 200° F. to about 500° F. for a time sufficient to produce a dry product. Obviously, if desired, the drying need not be accomplished in a separate step and the slurry may be introduced directly to the pyrolysis zone wherein such drying will be accomplished much more rapidly. Usually, at least equal parts of the acid solution are required to completely wet the apshaltene when it exists in solid form and thereby insure uniform contact. However, generally for the best reaction conditions, especially when solid asphaltenes are involved, the solution should be present in proportions from about 2 to about 6, 7 or 8 times greater than the aphaltenes or even in proportions somewhat higher if desired. The concentration of the acid in the solution utilized to produce the slurry may range generally from about 20% to about 80% by weight or somewhat higher, but usually concentrations of from about 40 to 70% are preferred with the solution being present in proportions by weight of from about 2 to about 6 times that of the asphaltene. Accordingly, the concentrations of nitric acid which provide the best reaction conditions and which are especially preferred for the practice of the present invention range from about 50 parts of $HNO_3$ by weight per 100 parts of asphaltenes to about 500 parts of $HNO_3$ by weight per 100 parts of asphaltenes or even somewhat higher if desired.

Also, nitric acid or nitric oxide in vaporous form may be reacted with the asphaltenes at a temperature, above about 200° F. and in proportions equivalent to those set forth above. Many manners of reacting the asphaltenes and the vaporous reactants may be utilized for the purposes of the present invention. For example, the extracted asphaltenes may be slurried in water or other suitable media and heated to temperatures above 200° F. while the vaporous reactant is conducted therethrough. Also, the asphaltenes may be rotated in a heated chamber while the vaporous reactant is introduced thereto or the vaporous reactants together with the asphaltenes may be fed simultaneously directly to the pyrolysis zone.

The pyrolysis temperatures required for the asphaltenes treated in accordance with our invention may be as low as about 500° C. but preferably temperatures between 500° C. and 650° C. are utilized. Normally, when asphaltenes are pyrolyzed, temperatures substantially above about 650° C. are required and the resulting product does not resemble carbon black but instead is generally a gray, gritty, coke-like material. Quite surprisingly, I have found that carbon products having a rigid mesomorphic structure characteristic of carbon black are not produced from untreated asphaltenes at the lower temperatures at which I am able to effectively pyrolyze the asphaltenes treated in accordance with the teachings of the present invention. Also, in contrast to the conventional coke-like material produced by the pyrolysis of non-treated asphaltenes, the products obtained from the practice of my invention are soft fluffy powders which are not at all gritty and which may be easily comminuted if desired. Moreover, the carbon blacks so obtained are about as jet as an HAF carbon black and have nigrometer scales of about 90. Also, the blacks wet easily into linseed oil and have good hiding power.

In accordance with the above-mentioned discovery one embodiment of my invention involves the treatment of the asphaltene with the reactant without extraction of the asphaltene from the hydrocarbonaceous tar stock. For example, it is well known in the art that tar stocks containing amounts of asphaltenes greater than about 25% do not yield suitable carbon black products when pyrolyzed. Such carbon black products are usually contaminated with relatively high concentrations of a hard gritty coke-like material which as stated above, represents the usual product of the pyroylsis of asphaltenes. Accordingly, one aspect of my invention involves the reaction of nitric acid especially or nitric oxides in the above-mentioned proportions with tar shocks containing high concentrations of asphaltenes, e.g. above about 25%, and the subsequent pyrolysis of such stocks to produce carbon black products which are essentially free of the hard, coke-like materials normally obtained in pyrolyzing such stocks.

However, the most surprising property of the carbon blacks produced by the pyrolysis of asphaltenes treated in accordance with my invention is the conductivity thereof especially when they are calcined at temperatures of about 1000° C. I have found that the calcined blacks produced from treated asphaltenes are surprisingly superior in conductivity than any of the conventional conductive blacks including the highly conductive acetylene blacks, which in some cases are also calcined. Accordingly, the calcined product of my invention has many obvious uses. For example, the calcined black may be utilized as a filler in dry cell batteries or as the carbon filler in forming baked carbon electrodes or in other such applications which will be obvious to those skilled in the art. Thus, the most preferred embodiment of my invention involves the extraction of the asphaltenes from the tar stock, the subsequent reaction thereof with preferably nitric acid prior to the pyrolysis thereof and thereafter calcining the product of the pyrolysis to produce carbon products of unusual electrical properties especially an unusually high conductivity.

The following examples are offered in order that the practice of my invention may be better understood. These examples are illustrative in nature and in no way are they to be construed to limit the scope of my invention beyond that imposed by the present specification and the claims which follow hereinafter.

EXAMPLE 1

1000 grams of a petroleum tar were mixed with 1 liter of benzene. The mixture was added to 20 liters of petroleum ether. The precipitated asphaltenes (40 grams) were filtered and washed with an additional 5 liters of petroleum ether.

10 grams of the asphaltenes obtained as described above were then added to about 50 mls. nitric acid solution and a slurry was formed. The concentration of the acid in the solution was 69%. The slurry was placed in an oven heated to 250° F. and allowed to remain there overnight. The dry material was then broken up, placed on an aluminum foil and heated over a bunsen flame. The pyrolysis took place rapidly at a temperature of about 600° C. 9.5 grams of product were obtained.

The resulting product was a soft fluffy carbon black having a nigrometer scale of 90.5. Electron microscope examination of the product revealed that the particles were large in area but thin; the planes of the black were remarkably uniform in thickness. Intense electron beam bombardment of the particles cause no substantial change thereof.

A portion of the above product was subsequent calcined in a nitrogen atmosphere at a temperature of 950° C. for 30 minutes. The calcined material was also examined under the electron microscope. The shape of the particles remained substantially unchanged. The electrical resistivity of the calcined product designated in Table I below as "Asphaltene Carbon" was determined and compared with the resistivity of conventional blacks. All resistivities were obtained in the same manner. The following data were obtained:

*Table I*

ELECTRICAL RESISTIVITY

| Grade | Calcination Treatment, ° C. | Resistivity (ohm-cm.) |
| --- | --- | --- |
| Vulcan XC-72 [1] | None | 0.27 |
| Vulcan 3 [2] | None | 0.86 |
| Vulcan SC [1] | None | 0.62 |
| Vulcan C [1] | None | 0.62 |
| Vulcan 9 [2] | 1,500 | 0.78 |
| Vulcan C | 1,500 | 0.51 |
| Vulcan 3 | 1,500 | 0.56 |
| Shawinigan Acetylene Black | 1,500 | 0.43 |
| Asphaltene Carbon | 950 | 0.05 |

[1] These are conductive oil furnace carbon blacks.
[2] These are oil furnace carbon blacks.

It is evident that the extremely low resistivity of the calcined carbon product produced from the treated asphaltenes outclasses conventional carbon blacks.

EXAMPLE 2

A sample of the non-nitric acid treated asphaltene of Example 1 was subjected to a temperature of 600° C. in the presence of air for several minutes to obtain a resulting product which was a gray, hard, gritty, coke-like material. Electron microscope examination of the product revealed a product comprised of particles of irregular size and of non-uniform thickness and not at all similar to the carbon product obtained in Example 1. Moreover, under an intense electron beam bombardment, the particles melted indicating that the particles were of a resinous rather than of a rigid mesomorphic structure characteristic of the product of Example 1.

Since the essence of my invention resides in the discovery that asphaltenes which have been treated with chemical oxidizing agents may be pyrolyzed at relatively low temperatures to produce carbon blacks having novel properties, especially when they are subsequently calcined at temperatures above about 800° C., many modifications may be introduced to the incidental features of my invention without departing from the spirit and scope thereof. Accordingly, various manners of reacting the oxidizing agent with the asphaltenes and many manners of introducing the so treated asphaltenes to various pyrolysis zones are contemplated within the scope of my invention.

Having described my invention, what I declare as new and desire to secure by U.S. Letters Patents is as follows:

1. A process for producing carbon black by pyrolyzing a hydrocarbonaceous tar containing amounts of asphaltenes greater than about 25% by weight of said stock, comprising mixing said tar with from about 20 to about 600 parts per hundred parts of asphaltene in said tar of a substance chosen from the group consisting of $HNO_3$ and nitric oxides and thereafter pyrolyzing the tar at temperatures of at least 500° C.

2. The process of claim 1 wherein the said substance is nitric oxide.

3. The process of claim 1 wherein the said substance is $HNO_3$.

4. The process of claim 3 wherein the $HNO_3$ is in solution form and is present therein in a concentration of at least 20%.

5. A process of producing a highly conductive form of carbon black comprising mixing asphaltenes with from about 50 to about 500 parts per hundred parts of asphaltene of a substance chosen from the group consisting of $HNO_3$ and nitric oxides, pyrolyzing the product of said mixture at temperatures above about 500° C. and calcining the product of said pyrolysis at temperatures above about 800° C.

6. The process of claim 5 wherein the said substance is nitric oxide.

7. The process of claim 5 wherein the said substance is $HNO_3$.

8. The process of claim 7 wherein the $HNO_3$ is in solution form and is present therein in a concentration of at least 20%.

9. A process for producing carbon black by pyrolyzing asphaltenes at temperatures above about 500° C. comprising mixing asphaltenes with a solution comprising from about 50 to about 500 parts $HNO_3$ per 100 parts of asphaltene, drying the resultant slurry at temperatures between about 200 to about 500° F. and pyrolyzing the dried product at temperatures above about 500° C.

10. The process of claim 9 wherein the product of said pyrolysis is subsequently calcined at temperatures above about 800° C.

References Cited by the Examiner

UNITED STATES PATENTS 2,572,734  10/51  Kramer _____ 23—209.6
2,686,107  8/54   Jordan _____ 23—209.1
2,964,460  12/60  Neuworth _____ 23—209.6

MAURICE A. BRINDISI, *Primary Examiner.*